United States Patent
Room et al.

[19]

[11] Patent Number: 5,927,491

[45] Date of Patent: Jul. 27, 1999

[54] RESILIENT U-CLIP ASSEMBLY

[75] Inventors: David Jarrett Room, Skokie; Paul Wolfgang Lackler, Elmhurst; Matthew Graszer, Palatine, all of Ill.

[73] Assignee: Stanley/Hartco Company, Skokie, Ill.

[21] Appl. No.: 08/637,710

[22] PCT Filed: Mar. 12, 1996

[86] PCT No.: PCT/US96/03361

§ 371 Date: Apr. 29, 1996

§ 102(e) Date: Apr. 29, 1996

[51] Int. Cl.[6] .............................. B65D 71/06; B65D 85/24
[52] U.S. Cl. ............................................. 206/340; 206/345
[58] Field of Search ...................................... 206/338, 340, 206/343, 345, 346, 344, 347, 820; 24/20 W, 20 CW, 23 W

[56] References Cited

U.S. PATENT DOCUMENTS

| | | |
|---|---|---|
| 3,613,878 | 10/1971 | Langas et al. . |
| 3,711,931 | 1/1973 | Ladouceur et al. . |
| 3,722,670 | 3/1973 | Plunkett . |
| 4,508,220 | 4/1985 | Pearson . |
| 4,648,158 | 3/1987 | West . |
| 5,303,821 | 4/1994 | Ayres . |
| 5,314,065 | 5/1994 | Ayres et al. . |

*Primary Examiner*—Jacob K. Ackun
*Attorney, Agent, or Firm*—Dvorak and Traub

[57] ABSTRACT

A resilient clip assembly for securing paired wires is formed by a plurality of similarly oriented U-shaped clips that are held together by a pair of parallel, spaced filaments which are secured to a top crown surface of each clip through a tongue member. The filament is elastically deformable such that each filament is compressed and retained within an opening after the tongue is depressed downwardly onto the filament, thus preventing the filament from extracting itself from the clip. No part of the filament or tongue extends into the wire-receiving cavity of the clip.

10 Claims, 7 Drawing Sheets

RESILIENT U-CLIP ASSEMBLY

BACKGROUND OF THE INVENTION

1. Field of the Invention

This invention relates generally to an improved U-clip and more specifically to an assembled arrangement of such clips which are abuttingly suspended in a continuous fashion on a carrier strip of pliant material so that the clips can be easily stored or used in a clinching tool, where the tool secures juxtaposed wires together.

2. Description of the Prior Art

U-clips have been well known and used with clinching tools in various fields such as upholstery or the mattress and bedding industries where either two wire springs, or a spring and a border retaining wire are secured together.

The U-clips are typically aligned and collated in a stacked configuration so that each individual clip is similarly arranged in abutting relationship with the adjacent clip. Clips arranged in a stacked configuration facilitate neat and orderly storage, as well as providing a linear alignment that is especially adapted for rapid and successive feeding of clips into a reformation or clinching tool which is positioned over a pair of parallel wires.

Stacks of clips can be wound under tension around a cylindrical core member, much like a spool of string, and then stored by packaging the spools in a shipping or storage carton. When an individual stack of clips is to be used, it is unwound under tension, beginning with the free end, and then the free end is inserted into the clinching tool in a linear fashion so that clamping together of at least two juxtaposed wires can occur. Most clips are retained in the collated stacks by employing various clip designs in conjunction with various retention means, such as adhesive tapes, or dimpled, grooved, or troughed clips which receive metallic wires, plastic filaments, or the like.

Because of the manufacturing requirements for high speed and uninterruptable feeding, the clip retention means must have a requisite flexibility and strength for withstanding the spool winding and unwinding forces, as well as feeding of the clinching tool. Furthermore, it is a desire not to incorporate a clip retention means which will ultimately affect or interfere with the clamping of the clip around the wires to be joined.

Various solutions have been previously proposed for interconnecting clips, such as U.S. Pat. No. 3,722,670 in which a clip assembly employs an elongated strand of plastic filament frictionally inserted into a preformed notch on each lateral side of the clip. However, this friction-fit arrangement has a tendency to dislodge the clip from the notch when spooling/unspooling tension forces are applied.

Other proposals, like that of U.S. Pat. No. 4,508,220, incorporate a very small diameter wire as the filament binding means. However, a shortfall of this method of assembly is that it requires the wire filament to be welded to the clip. Furthermore, once the wire filament is severed by the clinching tool, sharp, abrasive wire ends are exposed to the worker and the workpiece.

The U.S. Pat. No. 5,314,065 sought to overcome the above mentioned shortfalls by providing a clip with a plastic filament that was positively, rather than frictionally held against the side of the clip. This disclosure presents a rather complicated U-clip, wherein a filament-anchoring tab on each clip side is simultaneously compressed downwardly in order to positively attach the parallel filaments to the clip. Locating the filament-catching tabs along the sides of the clip, exposes a multitude of edges on each tab, causing collated clips to entangle with each other. When this happens, continuous unwinding and feeding of a spool of clips becomes problematic if not impossible. Another shortfall of this clip is that material is punched-out from the blank when forming the tabs; this weakens the clip. This methodology also wastes material and requires additional, and expensive tooling. Furthermore, the tab locations cause the filament strips to bridge across the legs of the clip and extend into the wire receiving cavity area of the clip, thereby interferring with the insertion of the wires into the clip cavity.

As evidenced by the shortfalls of the above-mentioned methods and apparatus, a true need still exists for an improved and simple U-clip and method for interconnecting such clips, wherein the identified shortcomings are overcome by providing a positive and flexible interconnection that does not extend into the wire-receiving cavity and which does not add complicated manufacturing tooling and control functions to the forming process, or undue additional costs.

SUMMARY OF THE INVENTION

It is a primary object of the present invention to provide an improved U-clip and method of assembly, wherein said carrier filament is attached to said clip through an extremely simple arrangement which provides a positive retaining stop for preventing filament extraction while the clips are assembled for storage, transport, or later use.

It is another objective of the present invention to provide an improved U-clip and method of assembly where no part of the clip or filament strip extends into the wire receiving cavity of the clip, thereby eliminating any possible interference with the wire crimping process.

It is still another object of the invention to provide a clip which does not punch-out material from the clip, thereby ensuring clip strength.

It is a final object of the invention to provide a clip which yields no sharp edges when a clip is severed from the stack, thereby ensuring that assembly will proceed without the clip catching or tearing against materials or even the assembler.

The above objectives are attained by providing a generally U-shaped clip which has an arcuate crown portion and laterally spaced leg portions downwardly depending from said crown. At each lateral end, the top of the crown is first provided with an upstanding tongue which has an end projecting above a lip formed into the crown surface. The lip delimits a tab opening which exists as a result of the formation of the upstanding tongue, said tab opening directly underlying said tongue and creating a pocket area for the filament strip to be compressed into when the tongue is pressed back towards the crown.

The plastic filament interconnects a collated stack of clips and provides flexibility and strength required for winding and unwinding the clips on and off the spooling means. After the filament is inserted, the tongues are deflected downwardly, back towards the crown surface in order to positively retain the filament to the clip; a partial reinsertion of the tab into the opening substantially reduces the interlocking and catch points the tongue would present if left upstanding.

When the clips of the present invention are used with a clinching tool, an individual clip will be severed from the stack or strip and no part of the filament will extend into the wire-receiving cavity, and for that matter, nor will any part of the tongue. Thus, it can be appreciated that no opportunity exists for any part of the retention tongue or the filament strip to interfere with the securement of the juxtaposed wires. This means that the crimping compressive forces created by the crimping tool will be fully directed directly into the clip, with no part of the crimping forces being wasted in compressing a protrusion of filament or tongue material, as happens with typical prior art clips. Furthermore, since the tongue is not formed by punching or removing material from the clip blank, this particular clip exhibits excellent strength characteristics. Additionally, since each tongue is partially pressed back into the tab opening, clips of the present invention have a low frequency of jamming within the clinching tool.

Finally, since a plastic filament strip is preferably used instead of metal, no sharp edges will be created when a leading clip is severed from the stack. Using a plastic filament also eliminates the problem of glue buildup which is normally present when clips are collated with tape, although it should be understood that other filament materials are not being excluded from the scope of the invention.

DETAILED DESCRIPTION OF THE INVENTION

Figure 1:
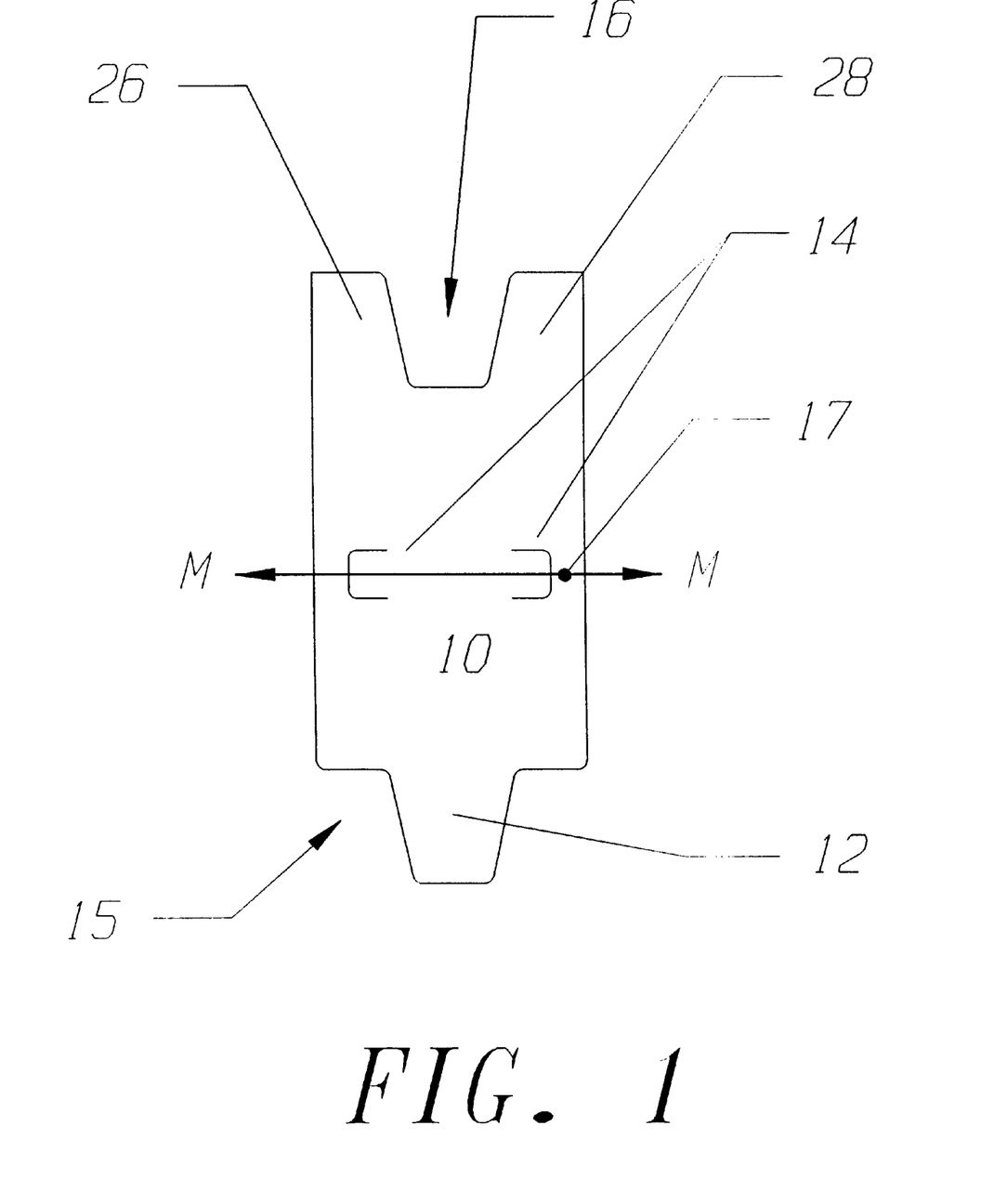
FIG. 1 is a plan view of a metal blank used to form a clip of the present invention.
Figure 2:
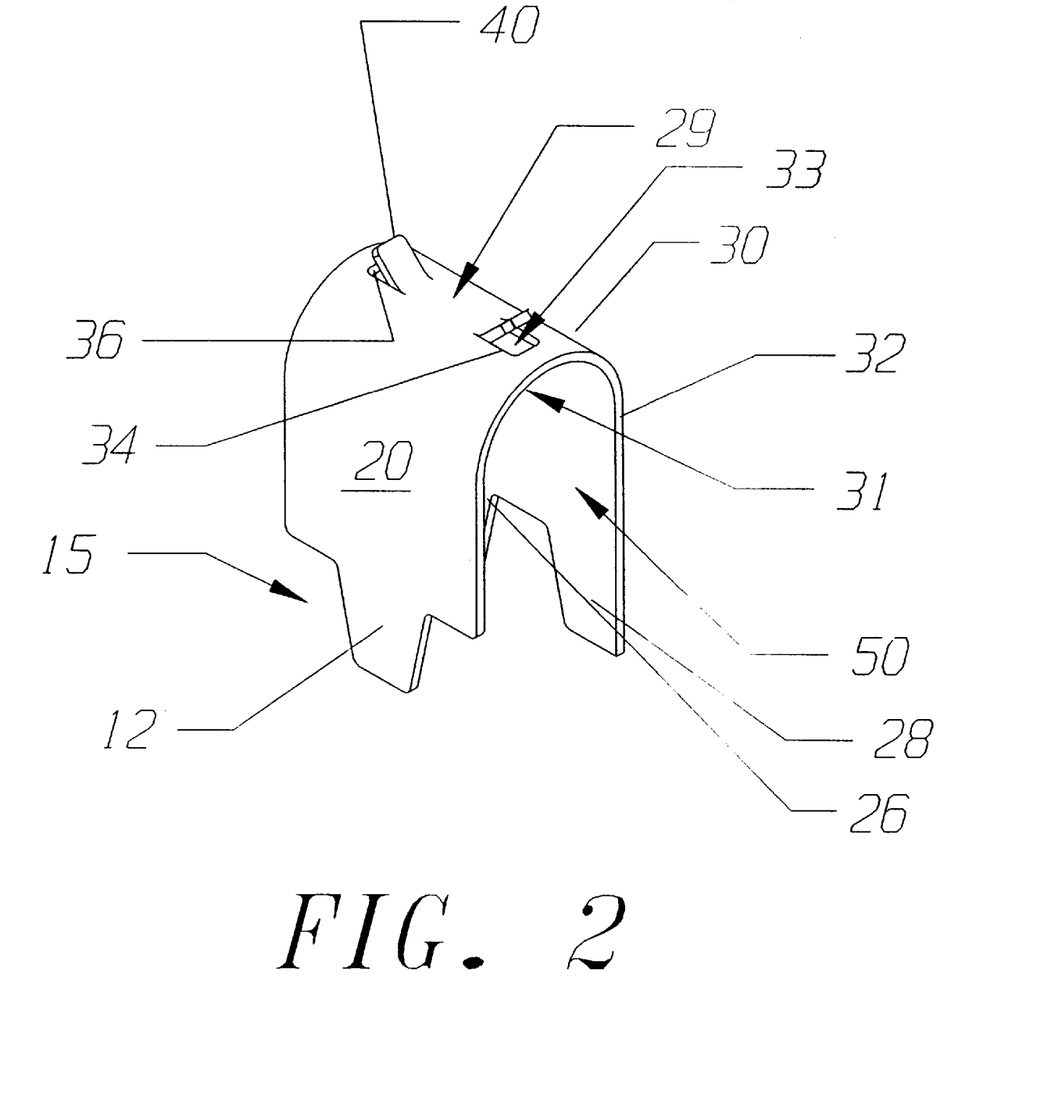
FIG. 2 is a perspective view of a U-shaped clip of the present invention formed from the blank of FIG. 1.

A metal blank shown in FIG. 1 at 10, is used to form the U-shaped clip 20 of the present invention, shown in FIG. 2. The blank is generally planar when initially stamped, being provided with arm 12 on its first end 15, a pair of slits 14 at the midsection 17, and a cut-out 16 on second end 19 which defines a first and a second crimping leg 26, 28. The blank 10 is bent along a laterally disposed midsectional axis M to form the generally U-shaped clip 20, as shown in FIG. 2. During the stamping forming operation, slits 14 are acted upon to produce the pair of upstanding tongues 40, located on an arcuate crown 30 of the clip. Each tongue is a mirror-image to the other, although each one faces a respective outside edge 32 instead of facing each other. Since tongues 40 are mirror-images and are symmetrically formed on the crown 30, only one tongue will be described in greater detail, although that description will equally apply to the other tongue. The same will be true with respect to the other components which cooperate with tongues 40. FIG. 2 also shows a wire receiving cavity 50 for accepting a pair of juxtaposed wires which are to be joined, wherein arm 12 will be drawn under and between the first and second crimping legs 26, 28, while legs 26, 28 are pulled upwardly and around the outside of arm 12 in an opposite direction such that each end 15, and 19 is joined around the wires (not shown).

FIG. 2 further illustrates that when each tongue 40 is formed into its upstanding position, a tab opening 33 is formed in crown 30, extending from crown top surface 29 to crown bottom surface 31. Each tab opening 33 preferably has a rectangular cross-sectional profile defined by the long side walls 34 interconnecting with the short side walls 36. Tongues 40 will upwardly project from top surface 29 at an angle between 30° to 75°, no matter the diameter of the filament being used; the filament will be described later. It should be clear that each tongue will generally have a cross-sectional profile that mirrors the profile of the tab opening 33.

Figure 3A:
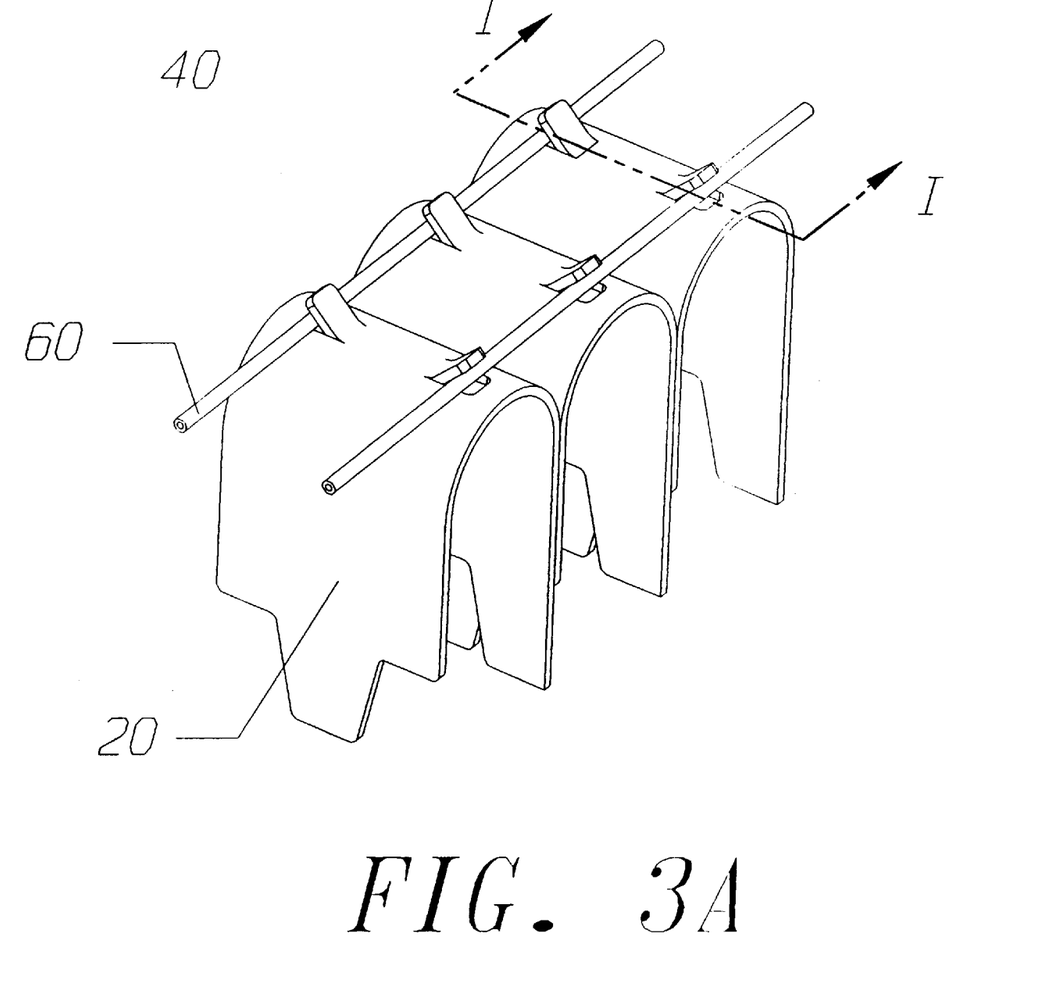
FIG. 3A is a perspective view showing a collated stack of clips and generally how the top surface of the crown retains the plastic filament therein.
Figure 3B:
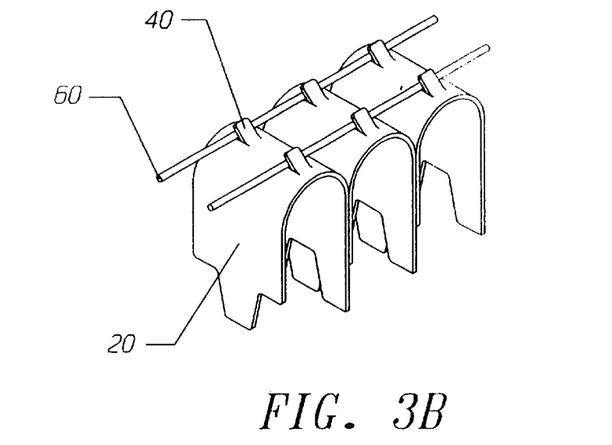
FIG. 3B is a perspective view showing a collated stack of clips wherein the upwardly projecting tongues point the same direction.
Figure 3C:
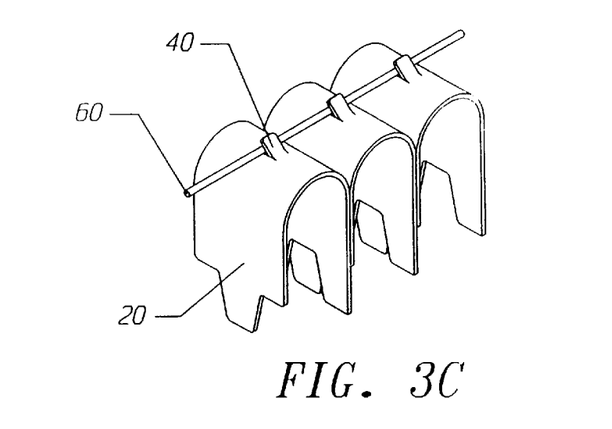
FIG. 3C is a perspective view showing a collated stack of clips wherein only a single tongue and filament arrangement is provided.
Figure 3D:
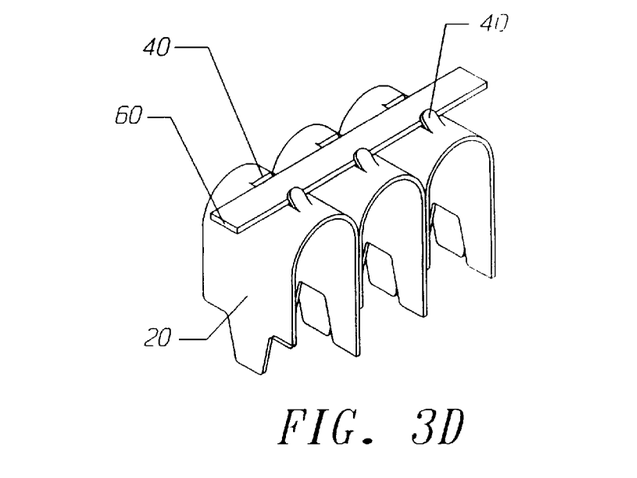
FIG. 3D is a perspective view of another variation to the tongue and filament arrangement.

FIG. 3A shows several aligned and abutting U-shaped clips 20 being interconnected together by a pair of laterally spaced and generally parallel filaments or strips 60 extending along longitudinal axis "L". This figure generally illustrates the cooperative arrangement of the clips, the tongues, and the pairs of filament, rather than any particular details of those members, or how the filament strips are actually inserted and retained on each clip. For greater detail on those facets, FIG. 4B is provided, which is a view along sectional line I—I of FIG. 3A. FIG. 4B illustrates that each filament strip 60 is laterally directed by a force F in a direction normal to axis L, in order to secure the filament to each clip at tongue 40. FIG. 3B shows another variation to the double filament clip of FIG. 3A. The clip of FIG. 3B merely emphasizes that the benefits of the present invention can be realized no matter if both tongues face each other, face away from each other, or face in the same direction. Depending upon the filament and its resistance to twisting, it is even envisioned that a single-tongued clip arrangement is possible, as shown in FIG. 3C, and for that matter, there is nothing prohibiting the single or double-tongued arrangement to incorporate a flat, rectangularly configured filament, as FIG. 3D illustrates.

Figure 4A:
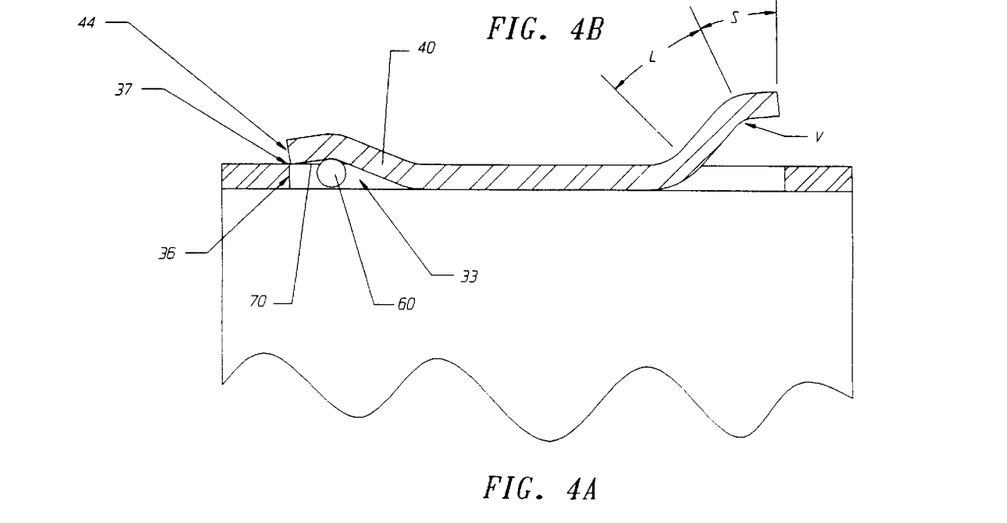
FIG. 4A is a cross-sectional view along line I—I of FIG. 3A, showing the filament and tongue arrangement both before and after the filament is squeezed into the tongue opening after the tongue is depressed.
Figure 4B:
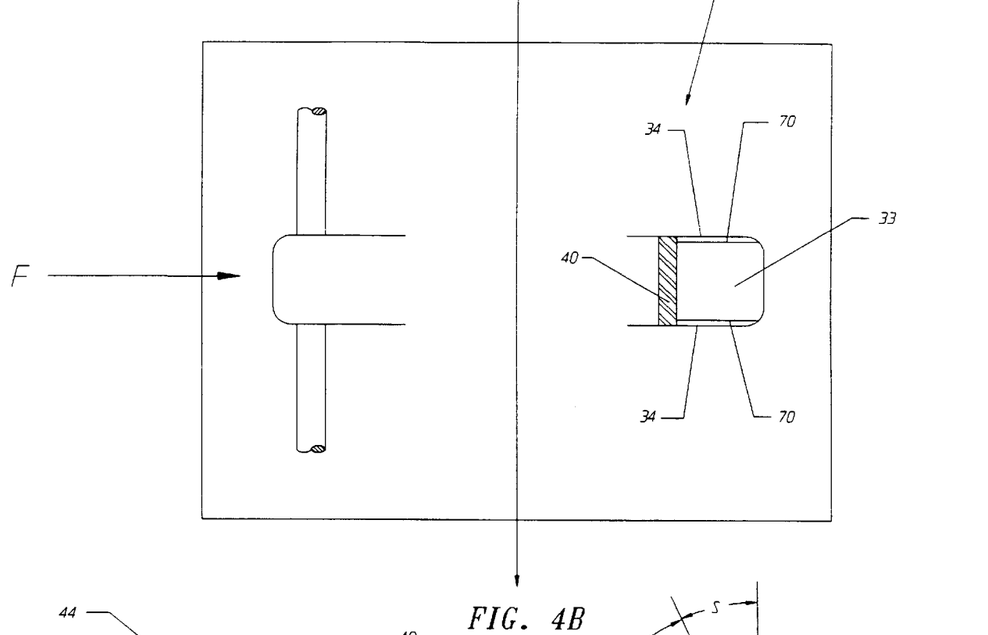
FIG. 4B is a top view of a clip with the tongue removed on the right clip side in order to emphasize the formation of the tab opening.
Figure 5:
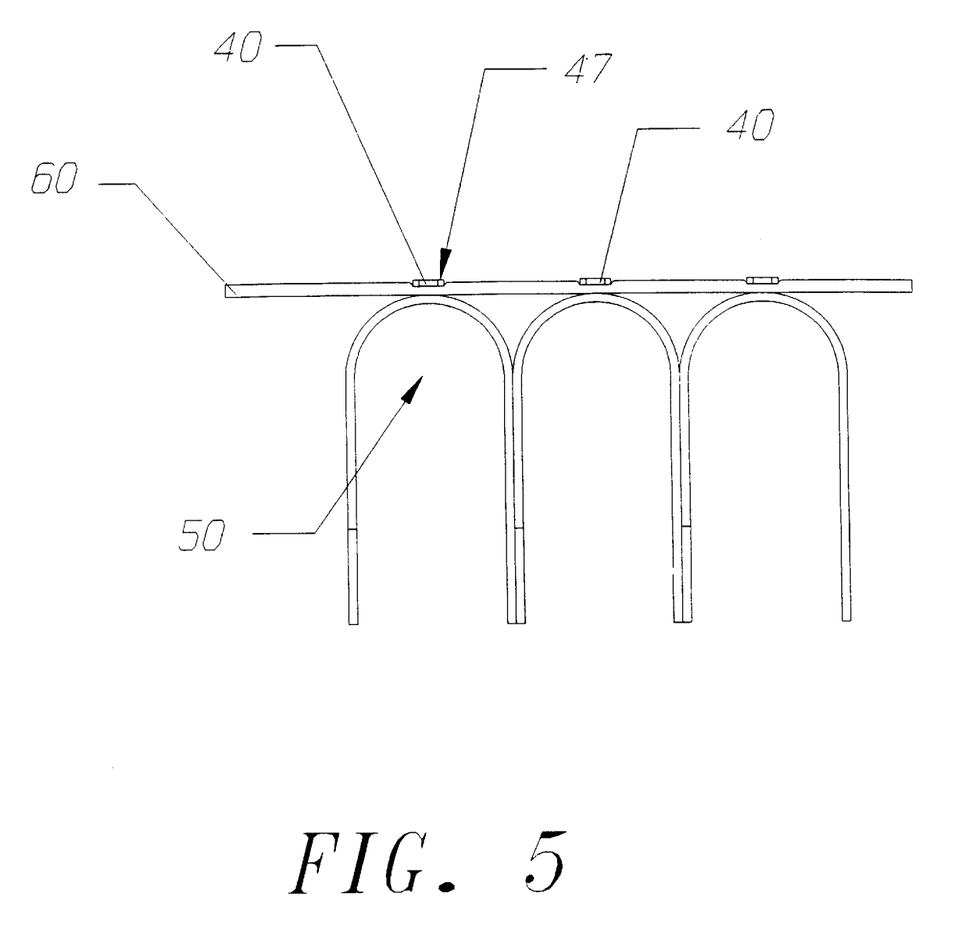
FIG. 5 is an end view between clips illustrating the filament position with respect to the crown.

Turning attention now to FIGS. 4A and 4B, greater detail of the tongue and filament arrangement will now be provided. From the side cross-sectional view of FIG. 4B, it is important to understand that the tongue 40 is generally rectangularly-shaped and is stamped, rather than punched-out of the blank material. This is important in protecting the strength and economy of the clip. By that it is meant that if the tongues were formed wherein some of the crown surface was punched-out by a punching tool, there would be a natural limitation as to how diminimus the punch-outed portion could become before the tools would start to spall or break. Thus, it should be appreciated that when the material is removed, a width limitation is created as a result of the tools. The present clip, on the other hand, does not punch-out any portion of the clip, so it has no limitation as to how dimensionally small the tongues can be made. This advantageously allows smaller filament diameters to be used, thereby providing a cost savings. This is an important feature of the invention since the filament is surprisingly a costly component. There is also less tool contamination with smaller filament diameters, since minute plastic particles are scraped from the filament when it is inserted in the clip.

More particularly, FIG. 4B shows the right tongue 40 being truncated so that other clip components can be more clearly seen. It can now be appreciated that when the tongue 40 is stamped from the blank, it projects upwardly off of top surface 29 of crown 30, forming the long walls 34 and the short wall 36, which collectively define the perimeter of tab opening 33. After the tongues are formed, the clip blank is then folded into its final U-shape, and because tab opening 40 is located on top of the arcuate crown surface, each of the long walls 34 becomes bent and slightly stretched, such that a lip portion 70 is formed on each long wall. As this figure emphasizes, the short wall 36 forms no lip. Because each of the tongues are stamped, rather than punched, the configuration of the stamping tools forms a dog-legged or hooked, cross-sectional configuration into each tongue. As FIG. 4A shows, each tongue 40 is resultantly defined by a long leg, designated by "L", and a short leg "S", each of which cooperatively form the arcuate vertex "V". The dog-legged configuration of each tongue is important to the present invention in several respects because it performs two important functions. Firstly, the vertex "V" creates a natural pocket for filament 60 to be retained and protected within, as the left hand tongue of FIG. 4B illustrates, and this factor is important in two respects. First, if no vertex were provided, the tongue could not be depressed back into the tab opening to the extent now achievable, otherwise, the filament would get severed. The lip 70 allows additional tongue depression towards tab opening 33 since this edge is not a sharp, discrete edge that could sever the filament. The extended surface area of lip 70 also provides an enlarged area for filament 60 to be conformed against, which further works against severing of the filament. Because the short leg "S" has a slightly angled orientation, it is a natural outcome that when the tongue 60 is pressed downwardly towards tab opening 33 after filament insertion, the leading edge or tip 44 makes touching contact against the edge 37 of the front short wall 36. As FIG. 4A illustrates, the left hand tongue is depressed back towards tab opening 33, and leading edge 44 is no longer in an upwardly exposed and prone position for creating catch points for other clips to become entangled against or for an assembler to cut his hand on. A low profile crown surface facilitates clean feeding and operation within the clip-binding tools.

A third advantageous effect of the dog-legged configuration is that vertex "V" facilitates a favorable orientation of the filament within and between adjacent clips. By that it is meant that a more contiguous, flatter top profile can be realized if the tongue can be depressed further into or towards the crown within the vertex of tongue 40, it has ample room to readily deform and spread across tab opening 33, without downwardly extending into the wire-receiving cavity 50. More importantly, it was discovered the vertex promotes the retention of the original outside diameter of the filament as it extends between the clips. This creates the favorable situation where the filament 60, upper outer surface and top surface 47 of tongue 40, are as close to the same level as possible. This favorably keeps the filament 60 in close proximity to any exposed sharp edges which are created on the sides of the tongues.

Another advantage to this clip design is that the structural strength of the clip is totally preserved since tongue formation does not require punching-out of metal material from the clip blank.

In a preferred embodiment, filament 60 is fabricated from a low density, plastic such as polypropelene, and in this case, also has a hollow interior, as best seen in FIG. 3A. The hollow interior provides additional compressibility and formability into tongue opening 33, although the ability of tongue 40 to be partially depressed back into tab opening 33 would still possible without severing a solid filament line to the vertex "V" as mentioned. Once inserted, filament 60 is tightly squeezed between the bottom surface 42 of tongue 40 and lips 70 when the tongue is downwardly depressed and it is received within tab opening 33 without projecting into wire receiving cavity 50.

Depressing each tongue back into tab opening 33 after the filament has been inserted is not performed in a single motion because it was discovered that a single, tongue-depressing operation places too much downward force on the clip, causing the clip legs 22, 24 to buckle. Secondly, the progressive deflection of each tongue ensures that the stresses within the filament to slowly distribute themselves, meaning the filament will elastically deform during the tongue pressing process.

Figure 6:
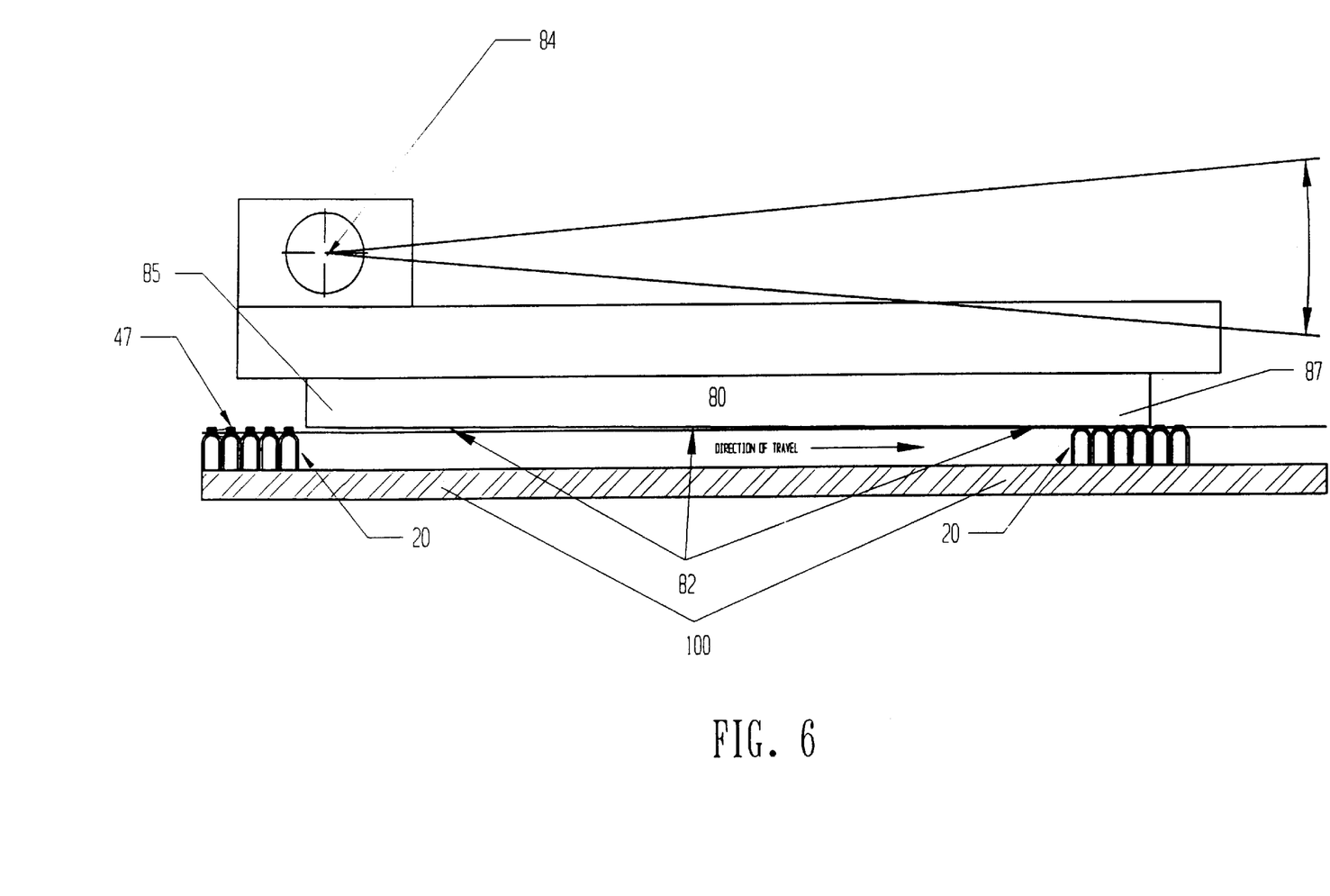
FIG. 6 is a side view of the tab-depressing operation.

FIG. 6 shows the operating mechanism for depressing tongues 40 in a progressive manner. As seen, a bar 80, having an angled or tapered bottom face 82, is moved in an up and down fashion, being hinged at 84. As the string of clips move along rail 100, a first end 85 of bar 80 contacts a tongue top surface 44, thereby barely making any downward displacement of tongue 40 into pocket 33. As clips 20 progress along the direction of the arrow, the tongue 40 is progressively depressed into pocket 33 according to its position along rail 100. When tongue 40 is finally contacted at second end 87, tongue 40 is depressed to a position within pocket 33 as best seen from FIG. 4B. It should be made clear that each tongue 40 will not be completely depressed back into pocket 33 so as to be flush or coextensive with crown top surface 29. It is merely desirable to depress tongue 40 as close to surface 29 without cutting filament 60. The exact amount the tongue projects above surface 29 is more dependent upon the size of the clip and can be best determined by experimentation. It should also be understood, that the above-mentioned process is directed to depressing the tongues while they are first tied together in a continuous string formation. Strips of clips for use in hand-held clinching tools, can be easily cut the desired strip length from the string, through an additional process step.

It will be appreciated by those in the art that clips having differing geometries and with differing geometrically-shaped tongues, other than those identified herein, could be used for forming the collated stack of clips joined by the filament, and that various modifications thereof would not circumvent the scope of the present invention presented in the following claims.

We claim:

1. A collated stack of sheet metal clips in one of a strip and string form which are positioned along a longitudinal axis, comprising:

a plurality of generally U-shaped clips arranged in a continuous, abutting relationship, each of said clips defined by an arcuate crown portion having a top surface and a bottom surface and a first and a second leg portion downwardly depending from said crown portion, and a pair of opposed side edges, each of said clips disposed such that said crown portion traverses said longitudinal axis;

a pair of opposed, upstanding tongues projecting from said top surface of said crown portion, each of said tongues laterally displaced from said longitudinal axis by an equal distance, and having a base end, a terminal end, and a top, bottom, and end surface, each of said tongues having a generally dog-legged configuration defined by an interconnected long leg and a short leg, said legs forming a vertex;

tongue opening directly underlying each respective said tongue, said opening extending between said top and bottom surfaces of said crown and defined by a pair of long side walls interconnected to a pair of short side walls, each of said long walls having an extended edge which defines a respective lip;

a flexible filament disposed along said top surface of said crown parallel to said longitudinal axis, said filament inserted underneath each of said tongues and in contact therewith and with each of said filaments being compressed into said tongue opening as said tongue is partially depressed into said tongue opening, wherein said filament is prevented from being extracted from said clip when a tensile loading/unloading force is applied to said collated stack of clips.

2. The stack of sheet metal clips of claim 1, wherein said filament is received within said vertex, and said vertex protects said filament from becoming severed when said tongue is depressed into said tongue opening.

3. The stack of sheet metal clips of claim 2, wherein said bottom edge of said terminal end of said tongue is received within said tongue opening, and wherein said filament is deformed within said tongue opening such that said filament does not extend into said wire-receiving cavity.

4. The stack of sheet metal clips of claim 2, wherein said filament has a hollow center, thereby facilitating compression of said tongue into said tongue opening without becoming severed.

5. The stack of sheet metal clips of claim 3, wherein said short leg of said tongue is oriented downwardly towards said crown top surface, said downward orientation facilitating said tongue in covering said top edge of said short wall of said tongue opening when said tongue is partially depressed into said opening.

6. The stack of sheet metal clips of claim 4, wherein said filament is formed from a low density polypropelene.

7. A method of manufacturing a collated stack of sheet metal clips along a longitudinal axis, comprising the steps of:

forming a planar sheet metal blank into a generally U-shaped clip having an arcuate crown portion and spaced parallel leg portions downwardly depending therefrom, said clip having opposed side edges and a pair of opposed upwardly projecting tongues, each of said tongues located on said crown portion and respectively forming an underlying opening, each of said tongues laterally displaced from said axis by an equal extent, with each tongue having an end which faces a said side edge, said opening defined by a pair of long side walls interconnected to a pair of short side walls, wherein said long side walls include an edge in the form of a lip;

aligning a plurality of said similarly oriented U-shaped clips along said axis such that said tongues of each of said clips is aligned parallel to said axis;

providing a deformable filament along said longitudinal axis, in confronting relationship to each of said tongues;

applying a force to said filament in a direction normal to said longitudinal axis, said force causing said filament to frictionally wedge underneath said tongue;

downwardly depressing each of said tongues so as to elastically deform said filament within said tab opening, said tongue preventing said filament from being extracted from said clip when tensionally acted upon.

8. The method of claim 7, wherein each of said tongues are partially depressed back into said tongue opening, such that said top surface of said tongue is approximately coextensive with a top surface of said crown.

9. The method of claim 8, wherein each of said tongues has a dog-legged configuration formed by a long leg connected to a short leg each of said legs forming a vertex, said vertex receiving and protecting said filament when said tongue is depressed towards said crown surface.

10. The method of claim 9 wherein each of said tongues are progressively depressed partially back into said tongue opening in order to prevent buckling of said clip.

* * * * *